(12) United States Patent
Clifford et al.

(10) Patent No.: US 8,503,680 B1
(45) Date of Patent: Aug. 6, 2013

(54) DERIVING ENCRYPTION KEY SELECTION FROM A DATA MANAGEMENT RETENTION PERIOD

(75) Inventors: Thomas G. Clifford, Edina, MN (US); Wendy Ann Shavor, Shoreview, MN (US)

(73) Assignee: Symantec Corporation, Mountain View, CA (US)

( * ) Notice: Subject to any disclaimer, the term of this patent is extended or adjusted under 35 U.S.C. 154(b) by 630 days.

(21) Appl. No.: 12/198,849

(22) Filed: Aug. 26, 2008

(51) Int. Cl.
*G06F 12/14* (2006.01)

(52) U.S. Cl.
USPC ............................................. 380/277; 713/193

(58) Field of Classification Search
USPC ............................................. 380/277; 713/193
See application file for complete search history.

(56) References Cited

U.S. PATENT DOCUMENTS

| | | | |
|---|---|---|---|
| 2006/0101285 A1* | 5/2006 | Chen et al. | 713/193 |
| 2009/0092252 A1* | 4/2009 | Noll et al. | 380/277 |

\* cited by examiner

*Primary Examiner* — Azizul Choudhury
(74) *Attorney, Agent, or Firm* — Brill Law Office; Jeffrey Brill

(57) ABSTRACT

The traditional data retention attribute is used to intelligently select appropriate data encryption keys. Key life cycles are calibrated with data retention periods, such that encryption keys and the corresponding data are both available at the same time. A data management system passes a data retention period to a key management system as part of a request for a key. The key management system uses the received data retention period as a factor in selecting a key, such that the key life cycle is calibrated to the data retention period. The data management system then utilizes the key in encryption operations concerning corresponding data.

14 Claims, 2 Drawing Sheets ated with the same key 113 as other data 105 having a similar retention period 103. In this case, the key management system 109 selects a key 113 whose encryption allowed period will end shortly after R, but whose "disabled" period (i.e., decryption only time) will not be reached for a relatively long time, so that any data 105 encrypted with the key 113 will be available throughout its retention period 103. Of those keys 113 fitting this first criterion 107, the key management system 109 selects the key 113 which is the oldest (i.e., has been in the encryption allowed state the longest).

DERIVING ENCRYPTION KEY SELECTION FROM A DATA MANAGEMENT RETENTION PERIOD

TECHNICAL FIELD

This invention pertains generally to encryption key management, and more specifically to calibrating key selection to a data retention period.

BACKGROUND

Data encryption key management solutions have rules establishing key lifecycles (i.e., create key, provide key for encryption or decryption, provide key for decryption only, disable key, and finally destroy key). Thus, data encrypted within the context of a key management system can only be decrypted within the time frame determined by the corresponding key lifecycle. Data management applications (e.g., backup software) also have defined data retention periods, beyond which managed data is no longer available. Where data under such a management system is encrypted within the context of a key management system, access of the data is only possible during an overlapping period when both the managed data and the key are available. Without careful, manual coordination between the key management and data management systems, data availability cannot be guaranteed. It would be desirable to address this shortcoming.

SUMMARY

The traditional data retention attribute is used to intelligently select appropriate data encryption keys. Key life cycles are calibrated with data retention periods, such that encryption keys and the corresponding data are both available at the same time. A data management system passes a data retention period to a key management system as part of a request for a key. The key management system uses the received data retention period as a factor in selecting a key, such that the key life cycle is calibrated to the data retention period. The data management system then utilizes the key in encryption operations concerning corresponding data.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
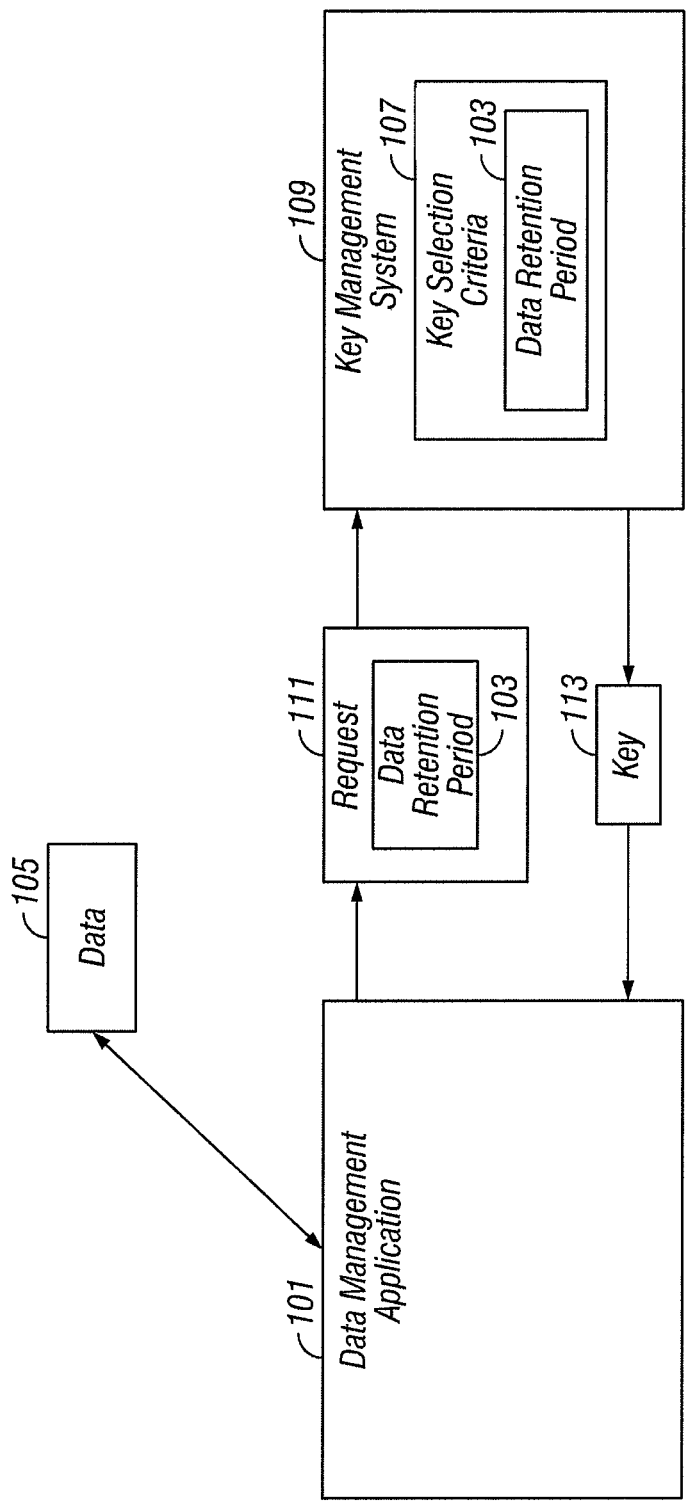
FIG. 1 is a block diagram illustrating calibrating key selection to a data retention period, according to some embodiments of the present invention.

FIG. 1 illustrates a system for calibrating key 113 selection to a data retention period 103, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a data retention period 103 of a data management application 101 is used not only to define when data 105 is to be available, but also to derive encryption key selection criteria 107. More specifically, data management policies such as retention periods 103 are configured as normal. When encryption is desired for data 105 being managed, the data management retention period 103 is passed to the key management system 109 with the request 111 for a key 113. The key management system 109 uses the data retention period 103 as one of the encryption key selection criteria 107, so as to select a key 113 whose lifecycle is synchronized to the data retention period 103. Key 113 selection is discussed in more detail below. The key management system 109 returns the selected key 113, which is used to encrypt the data 105, and the data management job continues as normal. Because the key lifecycle is synchronized to the data retention period 103, the key 113 and the data 105 will both be available at the same time, ensuring the desired accessibility of the data 105.

Addressing the key selection criteria 107 in greater detail, it is to be understood that the key management system 109 can select keys 113 based on various criteria 107, depending upon the desired behavior. As noted above, in various embodiments of the present invention, the key management system 109 uses the data retention period 103 as one of these criteria 107, so that there is a desired calibration between the key lifecycle and the data retention period 103. Various possible key selection schemes exist within such specifications.

To further illustrate such functionality, let R represent the data retention period 103. Given a data encryption key 113, the key 113 would have a lifecycle of the form {E,D,N,P}, where E represents the length of time encryption is allowed, D represents the length of time decryption is allowed, N represents the length of time neither encryption nor decryption is allowed but the key 113 still exists, and P represents the length of time until the key is purged or deleted.

In one embodiment of the present invention, given R, the key management system 109 chooses a key 113 so as to minimize the amount of data 105 encrypted with that key 113, and such that the key 113 is purged as soon as possible after R time. In other words, the key management system 109 selects a key 113 whose "disabled" period (i.e., the time at which point the key 113 is no longer automatically available for data decryption) begins shortly after the end of the data retention period 103. Of those keys 113 fitting this first criterion 107, the key management system 109 selects the key 113 which will transition out of the encryption allowed state (to the decryption only state) the soonest.

In another embodiment, given R, the key management system 109 chooses a key 113 so as to group and encrypt data 105 for time period N, yet such that the key 113 is purged as soon as possible after R time. In another example, given R, the key management system 109 chooses a key 113 for some given encryption criteria, yet such that the key 113 is purged after some time R+N'. These are just examples of using the data retention period 103 as a key selection criterion 107.

Figure 2:
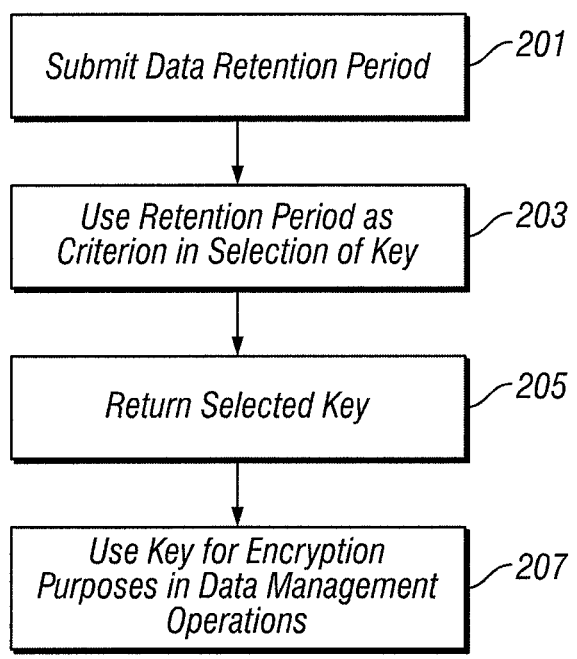
FIG. 2 is a flowchart illustrating steps for selecting and utilizing a key, according to one embodiment of the present invention.

FIG. 2 illustrates steps for selecting and utilizing a key 113, according to one embodiment of the present invention. A data management application 101 submits 201 a data retention period 103 to a key management system 109 with a request 111 for a key 115. The key management system 109 uses 203 the data retention period 103 as a criterion in the selection of a key 115. The key management system 109 returns 205 a key 113 to the key management system 101, which uses 207 the key for encryption purposes as part of its data management functionality. Because the data retention period 103 was taken into account in the selection of the key 113, the key life cycle is calibrated to the data retention period 103.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A machine implemented method for calibrating a key life cycle with a data retention period, the method comprising the steps of:
   receiving, by a computer, the data retention period;
   using, by the computer, the received data retention period as a factor in selecting a key from a plurality of keys each having a preconfigured key life cycle, such that the key life cycle of the selected key is calibrated to the data retention period;
   wherein using the received data retention period as a factor in selecting the key, such that the key life cycle is calibrated to the data retention period, further comprises selecting a key that is to be disabled upon expiration of the data retention period plus a constant;
   wherein the key life cycle comprises a preconfigured length of time encryption is allowed, a preconfigured length of time decryption is allowed, a preconfigured length of time after encryption and decryption are allowed but the key still exists, and a preconfigured length of time until the key is purged;
   wherein the length of time encryption is allowed is not equal to the length of time decryption is allowed; and
   utilizing, by the computer, the selected key in encryption operations concerning corresponding data.

2. The method of claim 1 wherein receiving the data retention period further comprises:
   receiving the data retention period as part of a request for a key.

3. The method of claim 1 wherein receiving the data retention period further comprises:
   receiving the data retention period by a key management system from a data management system.

4. The method of claim 1 further comprising:
   receiving the selected key by a data management system from a key management system.

5. The method of claim 1 wherein using the received data retention period as a factor in selecting a key, such that the key life cycle is calibrated to the data retention period, further comprises:
   synchronizing the key lifecycle to the data retention period such that the key and corresponding data are both available at the same time.

6. The method of claim 1 wherein using the received data retention period as a factor in selecting the key, such that the key life cycle is calibrated to the data retention period, further comprises:
   selecting a key that is to be disabled upon expiration of the data retention period.

7. The method of claim 6 further comprising:
   selecting the key that is to transition from an encryption allowed state to a decryption only allowed state before others from a plurality of possible keys.

8. At least one non-transitory computer readable medium storing a computer program product for calibrating a key life cycle with a data retention period, the computer program product comprising:
   program code for receiving the data retention period;
   program code for using the received data retention period as a factor in selecting a key from a plurality of keys each having a preconfigured key life cycle, such that the key life cycle of the selected key is calibrated to the data retention period;
   wherein the program code for using the received data retention period as a factor in selecting the key, such that the key life cycle is calibrated to the data retention period, further comprises program code for selecting a key that is to be disabled upon expiration of the data retention period plus a constant;
   wherein the key life cycle comprises a preconfigured length of time encryption is allowed, a preconfigured length of time decryption is allowed, a preconfigured length of time after encryption and decryption are allowed but the key still exists, and a preconfigured length of time until the key is purged;
   wherein the length of time encryption is allowed is not equal to the length of time decryption is allowed; and
   program code for utilizing the selected key in encryption operations concerning corresponding data.

9. The computer program product of claim 8 wherein the program code for receiving the data retention period further comprises:

program code for receiving the data retention period as part of a request for a key.

10. The computer program product of claim 8 wherein the program code for receiving the data retention period further comprises:

program code for receiving the data retention period by a key management system from a data management system.

11. The computer program product of claim 8 further comprising:

program code for receiving the selected key by a data management system from a key management system.

12. The computer program product of claim 8 wherein the program code for using the received data retention period as a factor in selecting a key, such that the key life cycle is calibrated to the data retention period, further comprises:

program code for synchronizing the key lifecycle to the data retention period such that the key and corresponding data are both available at the same time.

13. The computer program product of claim 8 wherein the program code for using the received data retention period as a factor in selecting the key, such that the key life cycle is calibrated to the data retention period, further comprises:

program code for selecting a key that is to be disabled upon expiration of the data retention period.

14. The computer program product of claim 13 further comprising:

program code for selecting the key that is to transition from an encryption allowed state to a decryption only allowed state before others from a plurality of possible keys.

\* \* \* \* \*